(12) United States Patent
Biziorek

(10) Patent No.: US 7,937,923 B2
(45) Date of Patent: May 10, 2011

(54) TRACTOR AND ROUND BALER COMBINATION WITH AUTOMATIC BALING AND AUTOMATIC REAR DOOR OPENING

(75) Inventor: Stéphane Biziorek, Champlitte (FR)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 12/257,673

(22) Filed: Oct. 24, 2008

(65) Prior Publication Data
US 2009/0107102 A1 Apr. 30, 2009

(51) Int. Cl.
*A01D 39/00* (2006.01)

(52) U.S. Cl. .............. 56/341; 56/343; 56/449

(58) Field of Classification Search .......... 56/10.2 R, 56/341–343, 432, 433, 449; 100/88
See application file for complete search history.

(56) References Cited

U.S. PATENT DOCUMENTS

| 5,230,400 A | * | 7/1993 | Kakinami et al. | 180/169 |
| 6,799,086 B2 | * | 9/2004 | Toki | 700/245 |
| 7,404,355 B2 | * | 7/2008 | Viaud et al. | 100/4 |
| 7,677,169 B2 | * | 3/2010 | Covington et al. | 100/35 |

FOREIGN PATENT DOCUMENTS

EP 974259 A1 * 1/2000

* cited by examiner

*Primary Examiner* — Alicia M Torres

(57) ABSTRACT

A tractor comprises an electronic tractor controller. A baler comprises a crop receiver, a baling chamber, a rear door, a rear door actuator, a bale size sensor associated with the baling chamber, and an electronic baler controller. The baler controller is operable to submit a halt signal to the tractor controller when a bale size signal provided by the bale size sensor indicates that a bale has reached a size corresponding to a predetermined size. The tractor controller then halts the tractor and the bale is wrapped. The rear door is opened automatically after the bale has been wrapped, but only if an obstacle sensor detects no obstacle in a detection zone behind the baler.

7 Claims, 3 Drawing Sheets

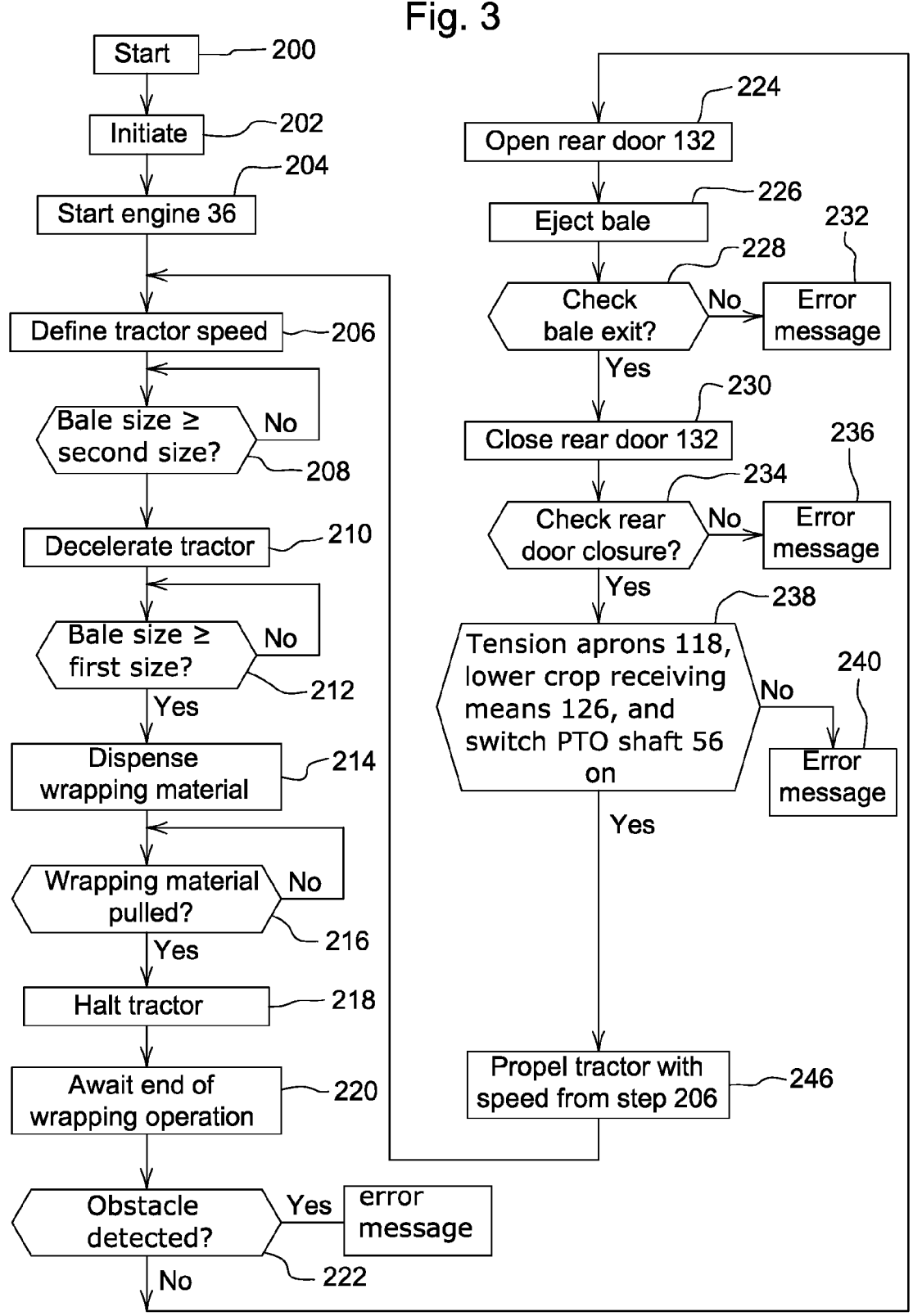

– 1 –

TRACTOR AND ROUND BALER COMBINATION WITH AUTOMATIC BALING AND AUTOMATIC REAR DOOR OPENING

FIELD OF THE INVENTION

The present invention relates to an agricultural tractor and baler combination with automatic baling and automatic rear door opening.

BACKGROUND OF THE INVENTION

A tractor/baler combination is used in agriculture to take up crop lying or standing on a field and to press and bind it into a bale. An operator sits at an operator station of the tractor and steers the tractor along the crop. In prior art systems, the operator needs to control a number of functions of the baler and the tractor, like stopping the tractor once a bale is ready for ejection, opening a rear door of the baler to allow a bale to eject, closing the door and resuming driving. The described duties are difficult for an inexperienced operator and fatiguing for an operator who has driven and controlled the tractor/baler combination for a longer time.

EP 1 813 146 A describes an automated tractor/baler combination in which the tractor is automatically stopped once a bale has reached its desired size. The door is then opened once the tractor operator has given a bale ejection signal via a keyboard, such that the operator has the chance to bring the tractor and baler into a suitable position when the actual position is not suited to eject a bale, e.g. on uneven terrain. After the bale was ejected, another signal from the operator is awaited from the operator before the baling operation is resumed. The operation of this tractor/baler combination is thus not entirely automatic, but relies on input from the operator.

Opening the door upon a confirmation signal from the operator involves a certain risk of accidents, since he/she might not see if there is an obstacle, like a person, standing behind the door that could be hit or injured by the opening door.

SUMMARY OF THE INVENTION

It is thus an object of the present invention to provide a tractor/baler combination with additional automatic functions that make work for the operator less fatiguing.

Another object of the present invention is to increase the safety when a baler is operated automatically.

According to the invention, a combination of a tractor and a round baler connected or coupled to or integrated into the tractor (as a self propelled baler) is provided. The tractor comprises a frame and ground engaging means supporting the frame upon the ground. The ground engaging means can be wheels or belts and are connected directly or via a drive train to an engine or motor, such that they can be driven to propel the tractor at least in a forward direction over a field. An electronic tractor controller is arranged to command the propelling speed of the tractor.

The round baler comprises a frame, a baling chamber mounted on the frame, a door through which a bale can be discharged from the baling chamber, and a door actuator for moving the door between a closed and an open position, a wrapping material dispenser suited to dispense a wrapping material like a twine, net or sheet to the bale, and a crop receiving means for collecting or receiving crop lying or standing upon a field and conveying the crop into the baling chamber. A bale size sensor detecting the size of the bale baled in the baling chamber is connected to an electronic baler controller, which is additionally connected to the door actuator and the wrapping material dispenser. The baler controller can be provided on the baler or on the tractor. When the bale size sensor detects that the size of the bale reaches or exceeds a first predetermined size, thus indicating that it is at the time to tie twine around the bale or to wrap it with net or foil, and hence no additional crop material should be introduced into the baling chamber, the baler controller submits a halt signal to the tractor controller and instructs the wrapping material dispenser to dispense a wrapping material to the bale. The tractor controller then commands the ground engaging means to halt, without an operator interaction.

One or more obstacle sensor(s) is (or are) observing a detection zone behind the baler. The detection zone comprises a space through which the rear door travels on its path between the closed and the open position, at least in the part between the ground and a height in the order of about 1 m. The baler controller is connected to the obstacle sensor and instructs the door actuator to open the rear door when the bale wrapping operation is ended and only when the obstacle sensor detects no obstacle in the detection zone.

In this manner, work of the operator is made easier since he/she does not need to observe a monitor or display requesting whether the rear door can be opened, since the door opens automatically and without operator interaction once the bale is wrapped. Accidents are prevented since the obstacle sensor disables the automatic opening operation of the door if an obstacle is in the opening range of the rear door. Thus, the entire baling operation can be automated, not requiring operator interaction.

The obstacle sensor can be a distance sensor, in particular a microwave sensor and/or radar sensor and/or ultrasonic sensor and/or a scanning laser sensor and/or an infrared sensor. In another embodiment or additional to the distance sensor, the obstacle sensor comprises a camera and an image processing system. The obstacle sensor can mount to the baler frame or to the rear door.

The door is preferably automatically closed again after ejection of a bale when a bale pass sensor has submitted a signal to the baler controller indicating that the bale has passed the door.

The baler comprises a number of elements and actuators that need to be brought into a suitable position or operation mode before a baling operation is started or resumed after a bale ejection. Examples are a tensioning system of aprons surrounding the baling chamber, the door actuator, a position control means of the crop receiving means, and a PTO of the tractor. It is proposed to put them automatically into the suitable position or operation mode, and to command a start of the driven ground engaging means of the tractor for a baling operation without operator interaction, but only when the recited elements and actuators are all in a suitable position or operating mode.

BRIEF DESCRIPTION OF THE DRAWINGS

A preferred embodiment of the invention is shown in the drawings, in which.

DESCRIPTION OF THE PREFERRED EMBODIMENT

Figure 1:
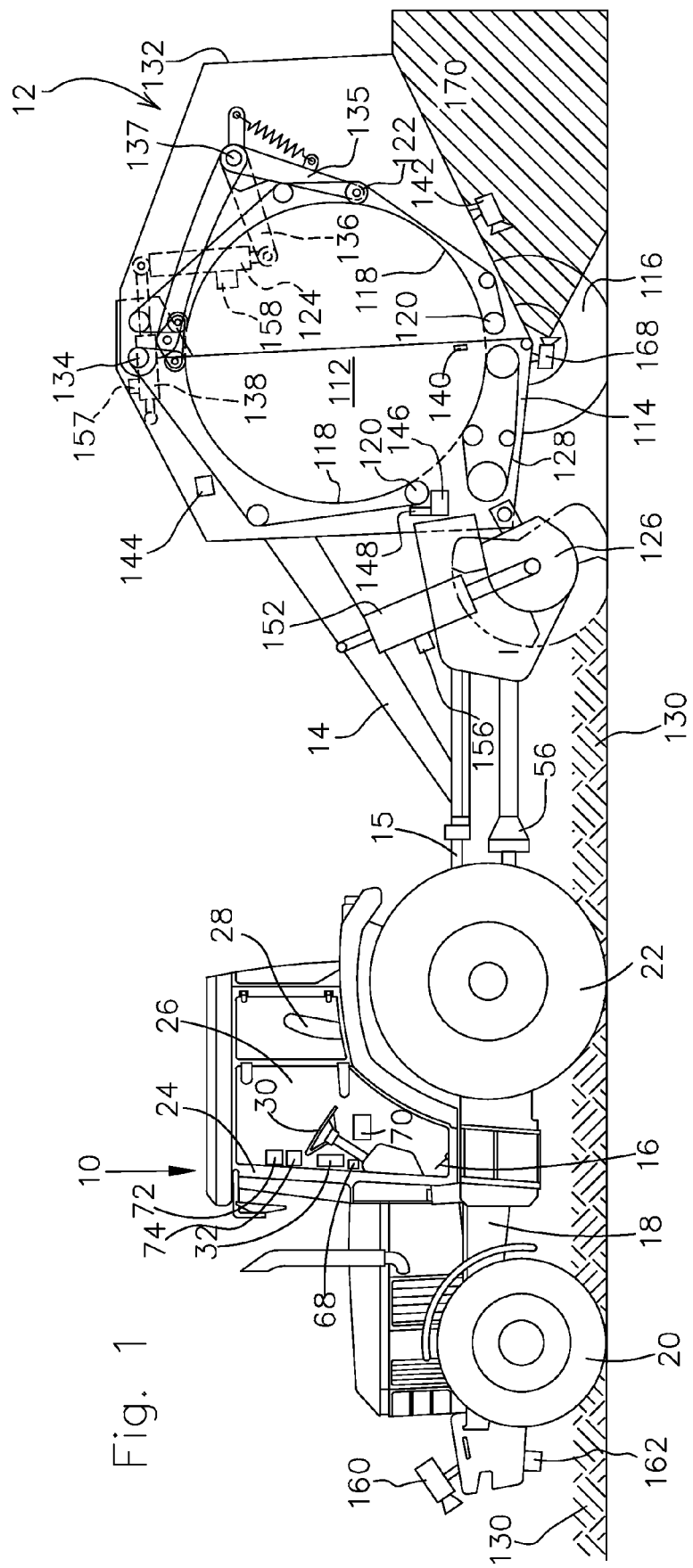
FIG. 1 is a lateral view of a tractor with a round baler.

FIG. 1 shows a lateral view of tractor 10 and a round baler 12 coupled to a drawbar hitch 15 of the tractor 10 by means of a drawbar 14. The tractor 10 is supported on a frame 18, which is supported on steerable front wheels 20 and movable rear wheels 22 serving as ground engaging means, and supports a cabin 24 wherein the operator's workstation 26 is located. In the following, direction indications as front and rear, left and right, are given with respect to the normal forward direction of the tractor 10 that goes in FIG. 1 to the left.

Tractor

The operator's workstation 26 includes a seat 28, a steering wheel 30, a gas pedal 16, and another pedal for the brake and clutch (not shown), and input elements arranged in the operators workstation 26 within reach of the operator for setting the selectable functions of the tractor 10. The latter includes a selection device 32 for the transmission gear of a power take off shaft gearbox 46, a hand throttle lever 70, a power take-off switch 68, an input device 74 for setting a target torque value at the PTO output shaft 56, and a virtual terminal 72 of a bus system that operates according to ISO 11783 with a keyboard 90 and a display device 94 (see FIG. 2).

The selection device 32, the input device 74, and/or the power take-off switch 68 could also be implemented as menu items on the terminal 72. Instead of the terminal 72, any other input and display devices may be used. The gas pedal 16 is provided with a sensor that transmits electrical signals to an operator interface logic unit 64, the electrical signals containing information on the particular position of the gas pedal 16.

Figure 2:
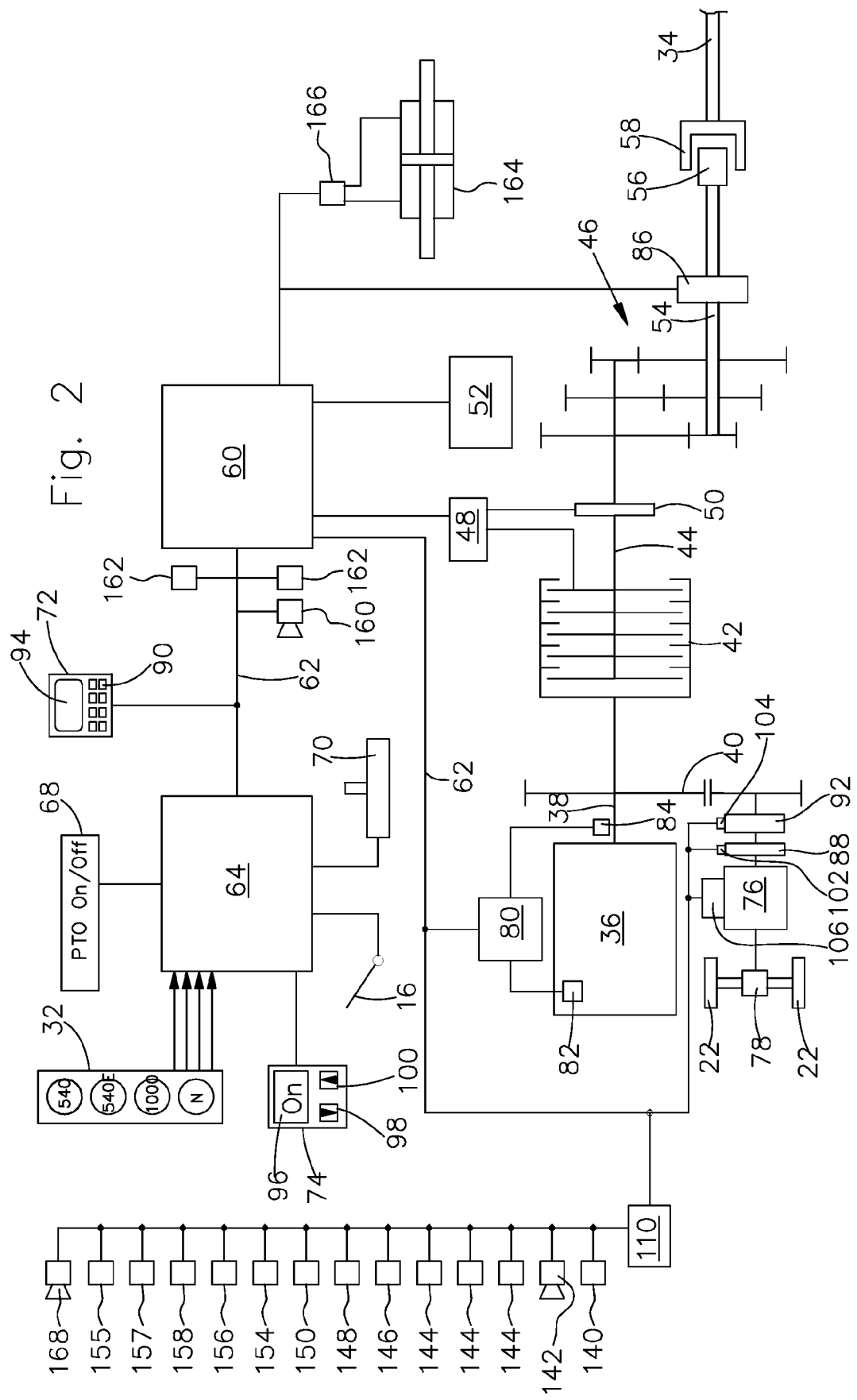
FIG. 2 is a schematic representation of the drive assembly of the tractor; and, FIG. 3 is a flow chart of a program under which the controllers operate when bales are produced.

FIG. 2 schematically illustrates the drive assembly of the tractor 10 for driving the rear wheels 22 and a power take off shaft 34 used for driving movable elements of the baler 12. A driving engine 36, usually a Diesel engine, drives a shaft 38, which, via a gearwheel 40, is used to drive the rear wheels 22 and preferably also the front wheels 20, and, if necessary, other movable devices of the tractor 10, such as an air conditioning compressor and a power generator. The rear wheels 22, and the front wheels 20, are driven by the gearwheel 40 via a clutch 88 and a drive transmission with continuously variable transmission ratios, or with stepwise selectable ratios, but constant within the individual transmission stages, and a differential 78.

The drive transmission can, for example, be a purely hydraulic transmission with a hydraulic pump driven by the clutch 88 and a hydraulic motor or hydrostatic transmission moving the wheels, wherein the transmission ratio of the gear can be changed by adjusting the swash plates of the pump and/or of the engine. In another embodiment, it is a multistage mechanical gearbox with a torque converter connected in series, such as used in passenger cars, or a mechanical gearbox with a sufficient number of transmission stages and an automatically switched clutch or planet gears and friction clutches. Also conceivable is the use of a drive transmission with stepless adjustable gearing, which for instance, works with V belts that rotate around pulleys with adjustable diameters, or with a mechanical and a hydraulic (or electrical) drive path, wherein a planetary transmission comprises an element driven mechanically with a fixed or stepwise variable speed and one driven hydraulically or electrically with variable speed, and the third element is used for output. A combination of several of the mentioned transmissions would also be conceivable.

In the illustrated embodiment, the drive transmission comprises a power shift transmission 92, which contains planetary gear sets with clutches and brakes that facilitate the changeover of speeds under load, and a secondary, manually shifted or synchromesh transmission 76. The power shift transmission 92 and the synchromesh transmission 76 are provided with actuators, 104 and 106 respectively, for selecting the transmission stage. Since both actuators 104 and 106 are controllable independently of one another, a high number of different transmission stages are available, derived by multiplying the number of transmission stages of the power shift transmission 92 with the number of transmission stages of the synchromesh transmission 76. Further inserted in the drive train between the power shift transmission 92 and the synchromesh transmission 76 is a clutch 88, which is movable through a clutch actuator 102 between a closed and open position.

The shaft 38 is also connected to a hydraulically operable clutch 42, which is connected to the output with an input shaft 44 of a power take-off gearbox 46. The clutch 42 is actuated by means of an electromagnetic valve assembly 48, which is also connected to a brake 50 positioned on the input shaft 44.

The power take-off gearbox 46 has three different, selectable transmission stages and therefore comprises three meshing gearwheel pairs. The transmission stage is selected by means of an electro-hydraulic (or electrical) actuator 52. Movable clutch elements determine which of the three gearwheels arranged on a driven shaft 54 of the power take-off gearbox 46 is in positive torque connection with the driven shaft 54. Alternatively, the actuator 52 could establish which of the three gearwheels arranged on the input shaft 44 is in positive torque connection with the input shaft 44. The actuator 52 enables the selection of three transmission stages. In the illustrated embodiment, a first transmission stage provides, at a nominal driving engine speed of 2100 rpm, a driven shaft speed of 1000 rpm. At a second transmission stage, at a lowered driving engine speed of 1800 rpm, the driven shaft speed is 540 rpm. At a third transmission stage, at a nominal driving engine speed of 2100 rpm, the driven shaft speed is 540 rpm. Moreover, it is possible to not couple any of the gearwheels of the power take-off gearbox 46 with the input shaft 44 and the driven shaft 54, thereby placing the power take-off gearbox 46 into a neutral position, wherein the driven shaft 54 is freely rotatable, even when the brake 50 is activated.

The driven shaft 54 is connected to a power take off output shaft 56 in the form of a power take off stub shaft. The power take off shaft 34 of the baler 12, equipped with a sleeve shaft end piece 58, is slid onto the power take-off stub shaft. The power take off shaft 34 is normally designed as a universal joint propeller shaft.

An electronic tractor controller 60 is connected to the valve assembly 48 and to the actuator 52. Moreover, the electronic tractor controller 60 is connected to an operator interface logic unit 64 by means of a device bus 62 (e.g., CAN bus), which is connected to the selection device 32, the input device 74, the gas pedal 16, the hand throttle lever 70, and the power take-off switch 68. The tractor controller 60 is moreover connected by the bus 62 to the virtual terminal 72, the actuators 104 and 106, and the clutch actuator 102 of the clutch 88. The selection device 32 comprises four pushbuttons, which are respectively assigned to the previously mentioned three transmission stages and to the neutral position of the power take-off gearbox 46.

The selection device 32 makes it easy for the operator, through manual operation of the four pushbuttons, to select one of the three transmission stages of the power take-off gearbox 46 or the neutral position. The user interface logic unit 64 transmits information on the operator's setting via the bus 62 to the tractor controller 60, which controls the actuator 52 in accordance with the information received. Each transmission stage selected may be displayed to the operator by illuminating the assigned pushbutton of the transmission stage selection device 32.

If the operator puts the power take-off switch 68 into the operating position, the operator interface logic unit 64 transmits the corresponding information, via the bus 62, to the tractor controller 60, which prompts the valve assembly 48 to release the brake 50 and to engage the clutch 42. If the operator puts the power take-off switch 68 into the non operating position, the operator interface logic unit 64 analogously transmits corresponding information, via the bus 62, to the tractor controller 60, which prompts the valve assembly 48 to disengage the clutch 42 and to activate the brake 50.

The tractor controller 60 is connected, via the bus 62, to an engine controller 80, which in turn controls an injection assembly 82 of the engine 36 and to which information about the respective speed of the shaft 38 is fed by a speed sensor 84. A sensor 86 connected to the tractor controller 60 determines the torque transmitted by the driven shaft 54. The speed sensor 84 may optically (through perforated rotary encoder discs connected to the shaft 38) or magnetically (through magnets connected to the shaft 38, which work together with induction coils, reed relays or hall sensors) interact with the associated shaft 38 to determine the speed. The speed may also be determined by other suitable means. The sensor 86 comprises strain gauges positioned on the driven shaft 54, whose terminals are connected to the tractor controller 60 by means of sliding contacts, in order to determine the elastic torsion of the driven shaft 54 caused by the transmitted torque. Any other embodiments of the sensor 86 may be used, for instance, laser sensors for determining the torsion of the driven shaft 54.

The third input device 74 comprises three keys 96, 98 and 100. The first key 96 is used to switch on an automatic mode of operation and the other keys 98, 100 to reduce (key 98) or enlarge (key 100) the target torque value at the driven shaft 54.

In operation, the tractor controller 60 instructs the engine actuated control 80 to let the driving engine 36 run at a speed that corresponds to the current input of the selection device 32, i.e., depending on the pressed key of the selection device 32, with a fixed speed of 2100 rpm or 1800 rpm. Alternatively, the speed is entered by the operator via a torque input device (not shown) or via the virtual terminal 72. If the neutral position is selected, the torque of the driving engine 36 will depend on the position of the gas pedal 16 or of the hand throttle lever 70, or is entered by the operator, or is pre-set.

Baler

Referring again to FIG. 1 and also to FIG. 2, the baler 12 comprises a baler frame 114 supported on wheels 116. The frame 114 supports a baling chamber 112 surrounded by aprons 118 guided around rollers 120. An arm 135 supporting a roller 122 can be moved upwardly and downwardly by means of a hydraulic cylinder 124. The hydraulic cylinder 124 is connected to the arm 135 via a lever 136 that is pivotally mounted at a horizontal axis 137. The hydraulic cylinder 124 thus defines the tension of the aprons 118. Below the front edge of the baler 12, a crop receiving means 126 in the form of a pick-up with tines moving or rotating around a transverse axis followed in a crop flow direction by a conveyor belt 128 is located. The conveyor belt 128 could also be replaced by a rotor (not shown), or a rotor could be inserted in the crop flow direction between the crop receiving means and the conveyor belt 128. Instead of the pick-up, any other suitable crop receiving means could be used, like mowing and conveying units. The crop receiving means 126 collects crop lying in a swath 130 of grass, hay or straw on the field and feeds it into the baling chamber 112. The aprons 118 define a baling chamber 112 of a variable size. The aprons 118 are set into motion in their longitudinal direction during a baling process, since one or more of the rollers 120 is rotatively driven. The crop introduced into the baling chamber 112 is thus also rotating during baling, while the size of the baling chamber 112 increases over time since the bale causes arm 135 to move downwardly against the force of the cylinder 124.

A rear door 132 is pivotally mounted to the frame 114 at an axis 134 extending transversely to the forward direction of the tractor 10 and the baler 12 located on the roof of the baler 12. A door actuator 138 in the form of a hydraulic cylinder is mounted with one end to the frame 114 and with a second end to the rear door 132. The rear door 132 supports the rollers 120 surrounding the rear part of the baling chamber 112. Actuator 138 is connected to the rear door 132 such that it can pivot the rear door 132 upwardly (in FIG. 1 counter-clockwise) around axis 134 to be able to eject a bale from the baling chamber.

On board of the baler 12, a baler controller 110 is provided. The baler controller 110 is connected to the tractor controller 60 (shown in FIG. 2) via bus 62 by means of a cable with a releasable plug connected to a socket at the rear of the tractor frame 18 or via a radio connection. The baler controller 110 is additionally connected to a number of sensors and actuators.

A rear door sensor 140 connected to the baler controller 110 is mounted in the vicinity of the lower rear end of the baler frame 114 close to the lower front edge of the rear door 132 and is sensing whether the rear door 132 is closed or not by means of a switch actuated by the rear door 132.

A rear camera 142 is mounted to the lower rear face of the rear door 132. It is connected to the baler controller 110. The rear camera 142 provides video signals that can be displayed on the display device 94 (shown in FIG. 2) such that the operator can watch whether a bale is properly ejected. The signals of the rear camera 142 are additionally processed in an image processing system provided inside of or external to the baler controller 110 to provide an electronic indication whether a bale was properly ejected from the baling chamber 112.

Three bale size sensors 144 connected to the baler processor 110 are distributed over the width of the baling chamber 112. They sense the distance to the surface of the bale and/or of aprons 118 abutting the bale surface and provide thus information about the bale diameter at their respective location along the width of the bale. A first one of the bale size sensors 144 is assigned to a position close to the left edge of the baling chamber 112. A second one of the bale size sensors 144 is assigned to a position close to center of the baling chamber 112. A third one of the bale size sensors 144 is assigned to a position close to the right edge of the baling chamber 112. The bale shape detected by the bale size sensors 144 can be permanently displayed to the operator on the display device 94.

A wrapping material dispenser 146 is located close to the baling chamber 112. It is connected to the baler controller 110 and dispenses, once instructed so by the baler controller 110, a wrapping material like twine, ribbon, net or wrapping sheet to the baling chamber 112. The rotating bale catches or pulls the wrapping material such that it is then wrapped around the bale. A wrapping material movement sensor 148 is interacting with the wrapping material dispenser 146 and senses whether the bale is pulling the wrapping.

The crop receiving means 126 can be lifted by a hydraulic cylinder 152 that is controlled via an electromagnetic valve assembly 150 controlled by the baler controller 110. Another electromagnetic valve assembly 154 is controlling the hydraulic cylinder 124. The door actuator 138 is controlled by a third valve assembly 155. The hydraulic fluid for controlling the hydraulic cylinders 124, 152 and the door actuator 138 is provided by the hydraulic system of the tractor 10. Sensors 156 and 158 assigned to the cylinders 152 respectively 124 provide information about the position of the cylinders 152, 124 to the baler controller 110. Another sensor 157 senses the position of the door actuator 138 or of the door 132.

At the front of the tractor 10, a camera 160 viewing upon the swath 130 is mounted. The camera 160 provides a video signal to the tractor controller 60 that is processed in an image processing system provided inside of or external to the tractor controller 60 to provide an electronic indication about the location of the tractor 10 with respect to the swath.

Below the axle of the wheels 126, an obstacle sensor 168 is mounted. The obstacle sensor 168 is realized in the form of an ultrasonic distance sensor and has a detection zone 170 in rear area of the round baler 12. The detection zone 170 comprises an area between the ground and a height of about 1 m or higher or lower and comprises the lower part of the space through which the rear door 132 travels on its path between the closed and the open position and the space behind the baler 12. The detection zone 170 ends some meters behind the rear end of the closed rear door 132, such that obstacles outside the movement range of the rear door 132 (and of the area into which the bale is deposited) are not within the detection zone 170. In another embodiment, the obstacle sensor 168 could use microwave or radar or scanning laser technique or comprise a camera and an image processing system operable to detect obstacles in the detection zone 170. It would also be possible to mount the obstacle sensor 168 to the rear door 132. The obstacle sensor 168 is connected to the baler controller 110.

Automatic Baling Operation

In FIG. 3, a flow diagram schematically indicates how the shown tractor baler combination can be operated according to the invention. After start in step 200, the tractor controller 60 and the baler controller 110 are initiated, i.e. suitable software is loaded into their memories at step 202. In step 204, the engine 36 is started once the operator turns an ignition key or depresses a designated key.

Then, in step 206 a desired tractor speed is defined. In a preferred embodiment, the propulsion speed of the tractor 10 is initially specified by the gas pedal 16 or the hand throttle lever 70. The tractor controller 60 then controls the actuators 104 and 106 and, before and after operating the actuator 106, the clutch actuator 102 for disengaging and engaging the clutch 88, so that the drive transmission drives the wheels 22 at the desired speed. The torque at the driven shaft 54, measured by the sensor 86, is displayed on the display device 94 of the virtual terminal 72. As soon as the displayed torque corresponds to a target torque value that is optimal and appropriate for the attachment 12, the operator can operate the key 96 of the input device 74. The tractor controller 60 then ignores the inputs from the gas pedal 16 or the hand throttle lever 70, and by operating the actuators 104 and 106, adjusts the propulsion speed of the machine 10 such that the torque measured by the sensor 86 at least approximately corresponds to the target torque value. Key 98 facilitates a step by step decrease of the target torque value and key 100 facilitates a step by step increase of the target torque value, e.g., in increments of 10 Nm. Alternatively, or in addition, the desired target torque value may be entered via the keyboard 90 of the virtual terminal 72 as a numerical value. Furthermore, the manufacturer and type of attachment 12 may be entered via the keyboard 90 and the control unit 90 derives the target torque value therefrom using a database. The target torque value can also be stored in a memory (not shown), connected to the bus 62, on board of the baler 12, and the tractor controller 60 obtains it from the memory as needed.

In step 208, the baler controller 110 evaluates the signals from the three bale size sensors 114 and investigates whether any one of them indicates that the bale size is larger than a second bale size. This second bale size is slightly (e.g. 10 cm in diameter) smaller than a first bale size corresponding to a desired bale size input by the operator by means of the keyboard 90. If the second size has not been reached, step 208 is performed again.

On the other hand, if the bale size is equal to or larger than the second size, step 210 is executed, in which the baler controller 110 sends a deceleration signal to instruct the tractor controller 60 to decelerate the tractor 10 and to drive it with a certain, relatively small speed (e.g. 4 km/h).

In following step 212, the baler controller 110 again evaluates the signals from the three bale size sensors 114 and investigates whether any one of them indicates that the bale size is larger than the first bale size. If the first size has not been reached, step 208 is performed again.

However, if the bale size is equal to or larger than the first size, step 214 is executed, in which the baler controller 110 instructs the wrapping material dispenser 146 to dispense a wrapping material to the bale. If necessary or useful, the crop receiving means 126 could be lifted by the cylinder 152 upon command of the baler controller 110 before the wrapping material dispenser 146 is operated, and/or the tractor 10 can be halted by means of appropriate control signals from the baler controller 110 to the tractor controller 60 (see step 218). Step 216 follows, in which the baler controller 110 checks according to the signals provided by the wrapping material movement sensor 148 whether the bale has caught and thus pulls the wrapping material. If this is not true, step 216 is performed again, otherwise step 218 is performed, in which the baler controller 110 sends a halt signal to the tractor controller 60 which then stops the tractor. Step 220 follows, in which the wrapping operation is performed and its end is awaited, the end indicated by lapse of a predetermined wrapping time or when a predetermined length of wrapping material has been dispensed, what is detected by an appropriate sensor and signalized to the baler controller 110. An error signal (not shown) is submitted from the baler controller 110 to the display 94 when the wrapping material movement sensor has—after a predetermined time has passed—not submitted a signal to the baler controller 110 indicating that the wrapping material is pulled by the bale after the baler controller 110 has commanded the wrapping material dispenser 146 to dispense a wrapping material.

Thereafter, in step 222 the baler controller 110 requests a signal from the obstacle sensor 168. If the signal from the obstacle sensor 168 indicates that an obstacle is located within the detection zone 170, step 223 follows, in which an error message is displayed to the operator on the display device 94 and operation of the baler 12 is stopped for safety reasons.

On the other hand, if no obstacle is detected in the detection zone 170, step 224 is executed in which the baler controller 110 instructs the valve assembly 154 controlling the hydraulic cylinder 124 to un-tension the aprons 118 and commands the valve assembly 155 to actuate the door actuator 138 to open the rear door 132. Then, in step 226 the bale is ejected by gravitation, since a support of the lower rear parts of the bale by the rear door 132 is lacking. Additionally, it would be possible to drive the conveyor belt 128 below the baling chamber 112 by means of a clutch controlled by the baler controller 110 in a clockwise direction to eject the bale, using the belt 128 as ejection device. If there would be a rear ramp at the exit of the baler 12, it could also be lowered under control of the baler controller 110.

In step 228, it is checked based upon the video signals from the camera 142, whether the bale has been properly ejected from the baling chamber 112.

If the bale has, according to the video signals, indeed exited the baling chamber 112, step 230 is performed in which the valve assembly 155 controlling the door actuator 138 is instructed to close the door 132. Otherwise an error message is displayed to the operator at step 232. After step 230, the baler controller 110 checks in step 234 whether the rear door sensor 140 indicates that the rear door 132 has been closed. If this is not true, step 236 is performed in which an error message is displayed to the operator. The door position could also be checked based upon the signals of sensor 157; the door sensor 140 could thus be omitted. On the other hand, if the door 132 is closed, step 238 follows in which the baler controller 110 commands that the aprons 118 are tensioned, i.e. instructs the hydraulic cylinder 124 to move in an appropriate position, and lowers the crop receiving means 126 by commanding the hydraulic cylinder 152 to instruct tractor controller 60 to rotate PTO shaft 56. The operating state of these elements can be checked using the appropriate sensors (158 for the apron tension, 156 for the position of the crop receiving means 126 and information from the tractor controller 60, whether the PTO shaft 56 is rotating) and if any of these conditions are not fulfilled, an error message is given to the operator in step 240.

When all conditions in step 238 are fulfilled, step 246 follows in which the tractor 10 is accelerated to the last speed it had before step 208. After step 246, step 206 is performed again.

In case that an error message is displayed or acoustically brought to the attention of the operator (steps 232, 236 or 240), the operator can check the situation, if necessary take steps to resolve possible problems and once they are resolved, input a corresponding confirmation to the baler controller 110 via the keyboard 90. Control then continues with the previous steps (222, 228, 234 or 238) that led to the error message.

In a possible embodiment, steps 234 to 244 could also be inserted into the flow diagram of FIG. 3 between steps 204 and 206, in order to have an automatic check of the baler status already before the first bale is baled.

The described automatic operation makes control of the baler 12 significantly easier for the operator, since a number of processes are performed automatically. Any significant action of the operator on a brake pedal, the gas pedal 16, an emergency push button, or the hand throttle lever 70 would disable the automatic baling operation and halt all functions. This can be appropriate if the ground behind the baler 12 is not appropriate for ejecting the bale, because it is for example to steep. Then, a manual operation of the tractor 10 and baler 12 can be useful, which is followed by step 206.

Having described the preferred embodiment, it will become apparent that various modifications can be made without departing from the scope of the invention as defined in the accompanying claims.

The invention claimed is:

1. A combination of a tractor and a round baler, wherein:
the tractor comprises: a tractor frame, driven ground engaging means supporting the tractor frame upon the ground, and an electronic tractor controller operable to control a propelling speed of the ground engaging means;
the round baler comprises: a baler frame coupled to the tractor frame, a crop receiving means supported on the baler frame for receiving crop from a field, a baling chamber supported on the baler frame for pressing crop received by the crop receiving means into a bale, a door through which a bale can be discharged from the baling chamber, and a door actuator for moving the door between a closed and an open position, a wrapping material dispenser suited to dispense a wrapping material to the bale, a bale size sensor associated with the baling chamber for detecting the size of a bale within the baling chamber, and an electronic baler controller connected to the bale size sensor, to the door actuator, to the wrapping material dispenser, and to the tractor controller;
the baler controller being operable to instruct the wrapping material dispenser to dispense the wrapping material to the bale when a bale size signal provided by the bale size sensor indicates that a bale has reached a size equal to or exceeding a first predetermined size and to submit a halt signal to the tractor controller;
the tractor controller being operable to command the ground engaging means to automatically halt the tractor when receiving a halt signal from the baler controller;
wherein the baler controller is connected to an obstacle sensor for observing a detection zone behind the baler, the detection zone comprising a space through which the door travels on its path between the closed and open position;
wherein the baler controller is operable to command the door actuator to open the rear door only when the bale wrapping operation has ended and the obstacle sensor detects no obstacle in the detection zone; and,
wherein the round baler comprises a bale elector operable to cause a bale to leave the baling chamber through the door the bale ejector being connected to the baler controller, whereby the baler controller is operable to command the bale elector to elect the bale only when the bale wrapping operation is ended and the obstacle sensor detects no obstacle in the detection zone.

2. A combination according to claim 1, wherein the obstacle sensor comprises a distance sensor, in particular one of a microwave sensor, a radar sensor, a scanning laser sensor, an ultrasonic sensor, and an infrared sensor.

3. A combination according to claim 1, wherein the obstacle sensor comprises a camera and an image processing system.

4. A combination according to claim 1, wherein the obstacle sensor is mounted to one of the baler frame or the rear door.

5. A combination according to claim 1, wherein the baler controller is operable to command the door actuator to close the door once a bale pass sensor has submitted a signal to the baler controller indicating that a bale has passed the door.

6. A combination according to claim 1, wherein the baler controller is connected to at least one of: a tensioning system of aprons surrounding the baling chamber, a position control means of the crop receiving means, and a PTO of the tractor (10), and the baler controller is operable to provide a resume baling operation signal to the tractor controller only when at least one of: the tensioning system of aprons surrounding the baling chamber, door actuator, position control means of the crop receiving means, and PTO of the tractor is in a state in which another bale can be baled, and that the tractor controller is operable to control the ground engaging means to resume propelling the tractor after a halt caused by a halt signal from the baler controller only when the tractor controller has received a resume baling operation signal from the baler controller.

7. A combination according to claim 6, wherein the baler controller is operable to command the at least one of the tensioning system of aprons surrounding the baling chamber, the door actuator, the position control means of the crop receiving means, and the PTO of the tractor to get in a state in which another bale can be baled.

* * * * *